July 22, 1941. H. M. QUINN 2,250,080
SEIZING AND SERVING TOOL
Filed March 19, 1941
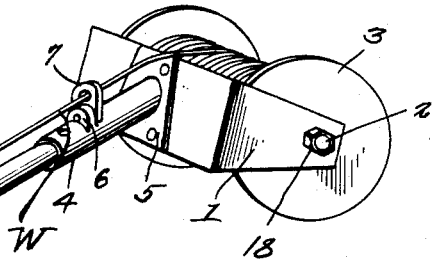
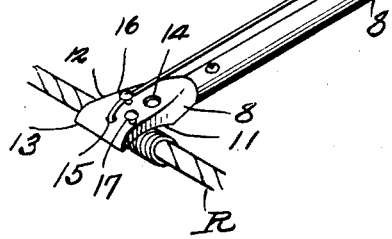
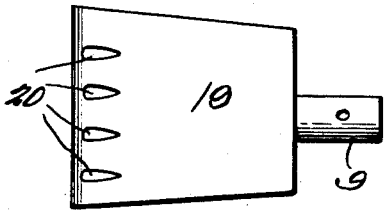
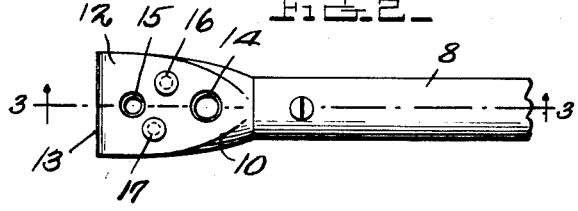
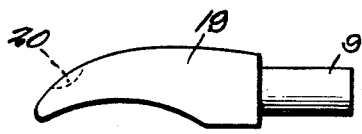
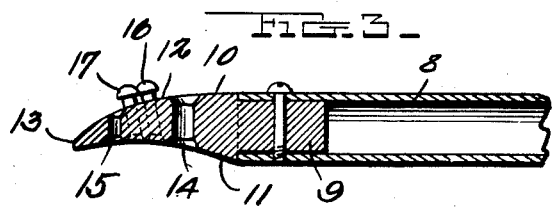
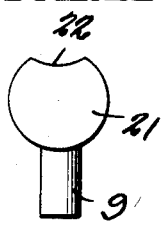
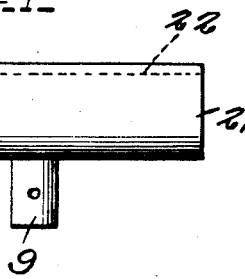
H. M. Quinn,
INVENTOR.
BY *[signature]*
ATTORNEYS.

Patented July 22, 1941

2,250,080

UNITED STATES PATENT OFFICE 2,250,080

SEIZING AND SERVING TOOL

Herbert M. Quinn, Bangor, Maine

Application March 19, 1941, Serial No. 384,184

5 Claims. (Cl. 57—10)

This invention relates to a seizing and serving tool for use in wrapping wire or the like about eyes, splices and other parts of rigging.

An object is to provide a tool of this character including a spool and a tension means whereby, when the tool is moved around the rope being wrapped, the strand of wire or the like being employed, will be drawn tightly about the rope and a neat and durable job quickly completed whether it be in a rigging loft, a shipyard or aboard ship.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawing

Figure 1 is a perspective view of the serving iron or tool in use.

Figure 2 is a plan view of the serving head of the tool.

Figure 3 is a section on line 3—3, Figure 2.

Figure 4 is a plan view of a modified form of head.

Figure 5 is a side view thereof.

Figure 6 is a side view of another form of head.

Figure 7 is a plan view thereof.

Referring to the figures by characters of reference, 1 designates a yoke having a removable spindle 2 on which a spool 3 is mounted to rotate freely. Wrapped on the spool is a strand of serving wire W or the like to be used as a wrapping for the rope to be conditioned.

A tubular shank 4 is extended from the center of the yoke and has a base plate 5 riveted or otherwise attached to the yoke. This shank is preferably inclined relative to the yoke and carries an ear 6 to which is secured a guide or fairlead 7.

A tubular arm 8 is secured at one end in the shank 4 while detachably secured in its other end is a stem 9 projecting from the serving head 10. In the structure shown in Figures 1 to 3 the head is in the form of a broad member having opposed concave and convex cylindrical surfaces 11 and 12 which converge to define a rounded terminal lip 13. Eyes 14 and 15 are provided in the head along its center, the smaller eye 15 being located near lip 13 while the other or larger eye 14 is nearer the stem 9.

Projecting from the convex surface 12 are studs 16 and 17 each having a head as shown. These studs are at opposite sides of the longitudinal center of the head and disposed on a line extending obliquely across the head.

Normally the spool 3 is held against free rotation by tightening a nut 18 on spindle 2 and contracting the yoke against the spool. When it is desired to use the tool for serving wire yarn or the like, the nut is loosened to release spool 3 for free rotation, and the serving strand W is threaded through guide 7 and eye 15 and fastened to the rope. By then swinging the tool downwardly toward the user and around the rope R the desired wrapping will be obtained. Obviously the tension on the strand W can be varied by engaging it with one or both of the studs for slipping contact therewith.

Should it be desired to seize a rope, a seizing line of several strands of wire or the like is cut to proper length. The yoke and spool are removed, one end of the seizing line is inserted upwardly through eye 14, downwardly through eye 15 and attached at one end to the rope R. The tool is then swung about the rope or ropes as before explained and will wrap the same securely. Additional friction and tension can be placed on the seizing line by feeding it partly around the two studs as it moves over surface 12 from eye 14 to eye 15.

Instead of providing a head as shown in Figures 1, 2 and 3, a modified form shown in Figures 4 and 5 can be used. The broad arcuate head 19 has guide notches 20 whereby two or more strands can be served simultaneously side by side.

The head 21 shown in Figures 6 and 7 is substantially cylindrical with a longitudinal recess 22 for bearing against the rope being conditioned or seized.

What is claimed is:

1. A combined serving and seizing tool including a head, said head having opposed concave and convex surfaces converging to a transverse lip at one end, an arm extending from the other end of the head, and spaced means on the convex surface of the head for frictionally engaging a strand carried by the head, and a spool removably connected to the arm.

2. A combined serving and seizing tool including a head, said head having opposed concave and convex surfaces converging to a transverse lip at one end, an arm extending from the other end of the head, and laterally spaced friction studs on the convex surface of the head.

3. A combined serving and seizing tool including a head, said head having opposed concave and convex surfaces converging to a transverse lip at one end, an arm extending from the other end of the head, and laterally spaced friction studs on the convex surface of the head, there being spaced openings in the head adjacent to the studs.

4. A combined serving and seizing tool including a head, said head having opposed concave and convex surfaces converging to a transverse lip at one end, an arm extending from the other end of the head, and a spool removably connected to the arm.

5. A combined serving and seizing tool including a head, said head having opposed concave and convex surfaces converging to a transverse lip at one end, and an arm extending from the other end of the head, there being a strand-receiving opening through the head, and a spool detachably connected to the arm.

HERBERT M. QUINN.